United States Patent
Nishikawa

(10) Patent No.: US 8,610,915 B2
(45) Date of Patent: Dec. 17, 2013

(54) PRINTING APPARATUS AND PRINTING SYSTEM FOR ALLOTTING ELECTRIC ENERGY USAGE

(75) Inventor: Naoki Nishikawa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1058 days.

(21) Appl. No.: 12/624,852

(22) Filed: Nov. 24, 2009

(65) Prior Publication Data

US 2010/0134834 A1  Jun. 3, 2010

(30) Foreign Application Priority Data

Nov. 28, 2008 (JP) ................................. 2008-303686

(51) Int. Cl.
*G06K 15/00* (2006.01)

(52) U.S. Cl.
USPC ....... 358/1.14; 358/1.13; 358/1.15; 358/1.16; 710/10; 710/19; 399/27; 399/70; 399/75; 399/94; 713/322; 713/323; 713/324; 713/340; 711/147

(58) Field of Classification Search
None
See application file for complete search history.

(56) References Cited

U.S. PATENT DOCUMENTS

| | | | |
|---|---|---|---|
| 7,188,264 B2* | 3/2007 | Morisawa ...................... 713/300 |
| 7,853,816 B2* | 12/2010 | Tanaka ........................... 713/323 |
| 2002/0140964 A1* | 10/2002 | Goto et al. ..................... 358/1.14 |
| 2007/0130481 A1* | 6/2007 | Takahashi et al. ............. 713/300 |
| 2008/0003033 A1* | 1/2008 | Aizawa ........................... 400/62 |
| 2009/0158072 A1* | 6/2009 | Radhakrishnan et al. .... 713/340 |

FOREIGN PATENT DOCUMENTS

| | | |
|---|---|---|
| JP | 2002-292977 | 10/2002 |
| JP | 2005-221748 | 8/2005 |
| JP | 2010-056728 A | 3/2010 |

OTHER PUBLICATIONS

Japanese Decision on Rejection mailed Feb. 15, 2011 in corresponding Japanese Patent Application No. 2008-303686, together with English language translation.

* cited by examiner

*Primary Examiner* — Miya J Cato

(74) *Attorney, Agent, or Firm* — Scully, Scott, Murphy & Presser, PC

(57) ABSTRACT

An image processing apparatus includes: an image processing unit that executes an image process in accordance with an instruction by a user; an accumulating unit that accumulates electric energy consumed in a preparation process of the image processing unit for each user; and a control unit which, if the image processing unit is made usable by the preparation process and executes image processes in accordance with a plurality of instructions by a plurality of users, controls the accumulating unit to allot and accumulate the electric energy for each of the plurality of users.

10 Claims, 6 Drawing Sheets

FIG. 6

| | |
|---|---|
| ACCUMULATED ELECTRIC ENERGY OF USER A | 1000Wh |
| ACCUMULATED ELECTRIC ENERGY OF USER B | 800Wh |
| OTHER ACCUMULATED ELECTRIC ENERGY | 300Wh |

PRINTING APPARATUS AND PRINTING SYSTEM FOR ALLOTTING ELECTRIC ENERGY USAGE

CROSS-REFERENCE TO RELATED APPLICATIONS

This application claims priority from Japanese Patent Application No. 2008-303686 filed on Nov. 28, 2008, the entire subject matter of which is incorporated herein by reference.

TECHNICAL FIELD

The invention relates to a printing apparatus and a printing system, which are capable of controlling consumption electric energy.

BACKGROUND

There has been proposed a technology, which is capable of controlling electric energy used in an image processing apparatus such as a copying machine.

For example, in one known technology, the electric energy consumed while a copying machine is in a standby state is evenly allotted to and accumulated for each of respective departments of an organization that use the copying machine.

Incidentally, another known technology proposes executing preparation processes for image formation, so-called warming-up, before an image processing apparatus, which has received a job, carries out an image process.

SUMMARY

Here, if electric energy consumed for the preparation processes is understood as electric energy consumed in a standby state, and the one known technology described above is applied to control the electric energy consumed for the preparation processes, the electric energy consumed for the preparation processes is evenly accumulated for each of the respective departments that use the copying machine.

However, in the above-described copying machine, even as regards a department or a user not transmitting any job and does not use the copying machine, the electric energy is accumulated for the department or the user.

Therefore, illustrative aspects of the invention provide an image processing apparatus and an image processing system, which are capable of allotting and accumulating the electric energy for preparation processes for a user giving an instruction for an image process or a group consisting of the users.

BRIEF DESCRIPTION OF THE DRAWINGS

FIG. 6 is a view showing accumulated electric energy displayed on a display unit of the MFP.

DETAILED DESCRIPTION

<General Overview>

Figure 1:
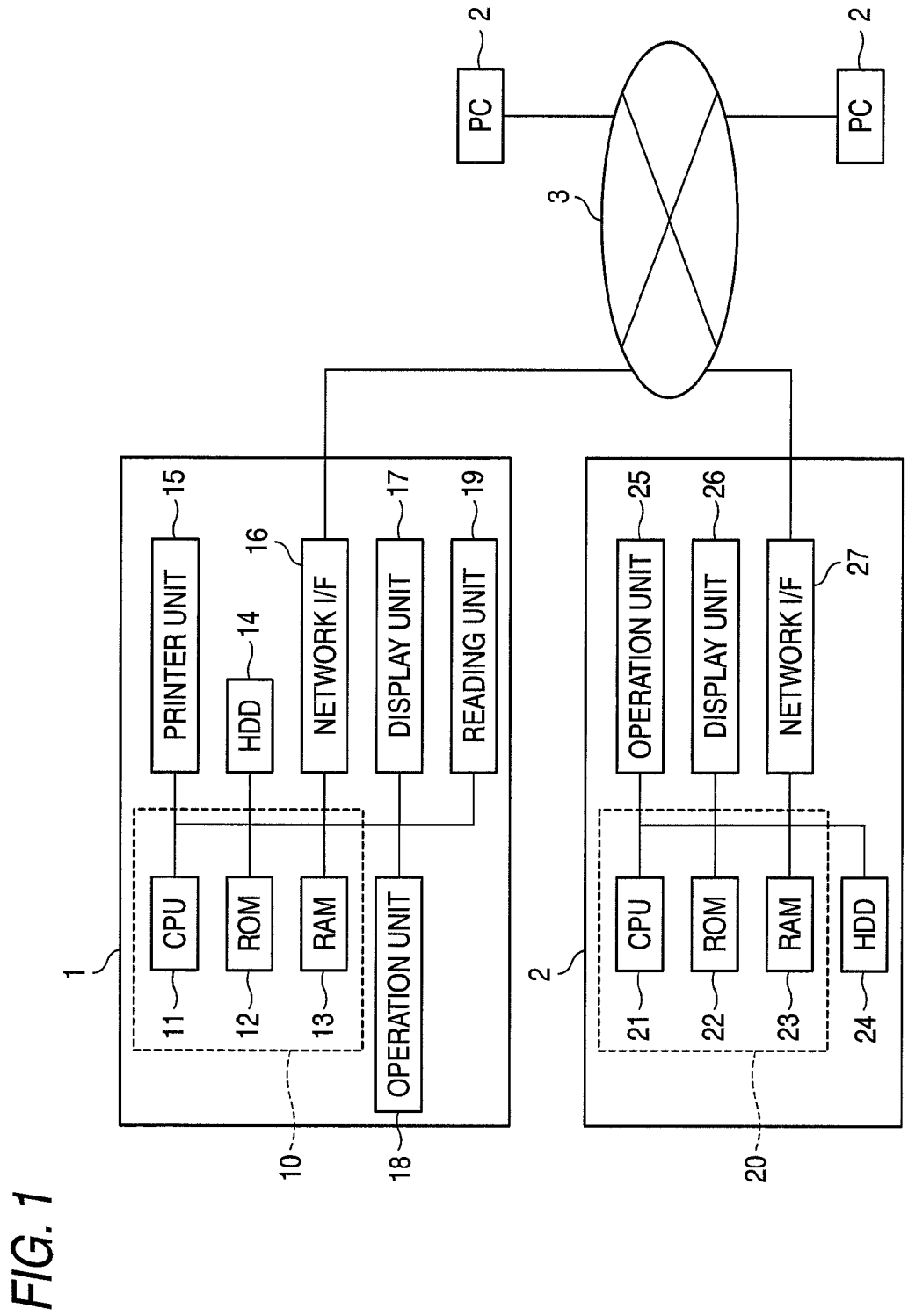
FIG. 1 is a block diagram showing a concept of an image processing system and an internal configuration of an MFP and a PC.

According to a first illustrative aspect of the invention, there is provided an image processing apparatus comprising: an image processing unit that executes an image process in accordance with an instruction by a user; an accumulating unit that accumulates electric energy consumed in a preparation process of the image processing unit for each user; and a control unit which, if the image processing unit is made usable by the preparation process and executes image processes in accordance with a plurality of instructions by a plurality of users, controls the accumulating unit to allot and accumulate the electric energy for each of the plurality of users.

According to a second illustrative aspect of the invention, in the image processing apparatus, wherein the accumulating unit accumulates the electric energy consumed in the preparation process of the image processing unit for each group of users, and wherein, if the image processing unit is made usable by the preparation process and executes image processes in accordance with a plurality of instructions by the plurality groups of users, the control unit controls the accumulating unit to allot and accumulate the electric energy for each of the plurality of groups of users.

According to a third illustrative aspect of the invention, in the image processing apparatus, wherein the image processing unit comprises a plurality of functional units corresponding to a plurality of types of the image processes, and wherein the accumulating unit accumulates the electric energy consumed in the preparation processes in accordance with the plurality of functional units, respectively.

According to a fourth illustrative aspect of the invention, in the image processing apparatus, wherein the control unit controls the accumulating unit to allot and accumulate the electric energy in accordance with ratios of the respective electric energy consumed by the plurality of instructions.

According to a fifth illustrative aspect of the invention, the image processing apparatus further comprises: a display unit that displays the electric energy accumulated by the accumulating unit for each user.

According to a sixth illustrative aspect of the invention, there is provided an image processing system comprising: an image processing unit that executes an image process in accordance with an instruction by a user; an accumulating unit that accumulates electric energy consumed in a preparation process of the image processing unit for each user; and a control unit which, if the image processing unit is made usable by the preparation process and executes image processes in accordance with a plurality of instructions by a plurality of users, controls the accumulating unit to allot and accumulate the electric energy for each of the plurality of users.

According to a seventh illustrative aspect of the invention, in the image processing system, wherein the accumulating unit accumulates the electric energy consumed in the preparation process of the image processing unit for each group of users, and wherein, if the image processing unit is made usable by the preparation process and executes image processes in accordance with a plurality of instructions by the plurality groups of users, the control unit controls the accumulating unit to allot and accumulate the electric energy for each of the plurality of groups of users.

According to an eighth illustrative aspect of the invention, the image processing system further comprises: a multi-function printer; and an image processing apparatus that is connected to the multi-function printer via a network, wherein the multi-function printer comprises the image processing unit, and wherein at least one of the multi-function printer and the image processing apparatus comprises the accumulating unit and the control unit.

According to the illustrative aspects of the invention, if an image process is executed by a plurality of users or a plurality of groups by an image processing unit made usable by preparation processes, the electric energy used for the preparation processes is accumulated for each of the plurality of users or for each of the plurality of groups.

Therefore, it is possible to allot and accumulate the electric energy used for the preparation processes with respect to a user who gives an instruction for an image process or a group consisting of the users.

Further, according to the third illustrative aspect, since the accumulating unit accumulates the electric energy for each of the functional units, it is possible to allot and accumulate the electric energy consumed in respective preparation processes with respect to a plurality of users who give an instruction for respective image processes.

Further, according to the fourth illustrative aspect of the invention, the electric energy used for the preparation operations is allotted and accumulated in accordance with the ratios of the job electric energy consumed by a plurality of jobs. Therefore, it is possible to allot and accumulate the electric energy in accordance with the details of the jobs.

Further, according to the fifth illustrative aspect of the invention, it is possible to check the electric energy accumulated for each user or for each group.

<Exemplary Embodiments>

Exemplary embodiments of the invention will now be described with reference to the drawings.

(Image Processing Apparatus and Image Processing System)

Referring to FIG. 1, an image processing apparatus and an image processing system according to the invention will be described.

In FIG. 1, a multi-function printer (hereinafter called "MFP") 1 provided as one example of an image processing apparatus according to the invention, and a personal computer (hereinafter called "PC") 2 are connected to each other via a network 3. In addition, in FIG. 1, the internal configuration of the PC 2 is shown with respect to only one PC 2. However, the other PC 2 has an internal configuration similar thereto.

The MFP 1 includes a printer unit 15, a network interface (I/F) 16, a display unit 17, an operation unit 18, and a reading unit 19. The respective units are controlled by a control circuit 10, which is composed of a CPU 11, a ROM 12 and a RAM 13, and which is one example of an accumulating unit and a control unit. Further, the MFP 1 includes a hard disk (hereinafter called "HDD") 14 that stores various types of information. Incidentally, the printer unit 15 and the reading unit 19 correspond to an image processing unit and an functional unit.

In the present exemplary embodiment, the electric energy consumed by a printing process, a reading process, and a copying process, etc., is measured by the control circuit 10 of the MFP 1 while the respective processes are in operation. The electric energy is thereafter collectively accumulated. Incidentally, process of the accumulation will be described later.

The printer unit 15 is a functional unit for executing a printing process of a printing job from the PC 2, etc., onto a sheet, and the reading unit 19 is a functional unit for executing a reading process to generate image data by reading a document. Further, by causing the printer unit 15 and the reading unit 19 to continuously function, a copying process to copy a document may also be executed. That is, the copying process is achieved by reading a document in a reading process, generating image data, and printing the image data onto a sheet in the printing process.

The network I/F 16 is a functional unit for connecting the MFP 1 to the network 3, and inputs data into and outputs data from the PC 2. Further, the display unit 17 is composed of an LCD, etc., and is a functional unit for informing a user of various types of information. Further, the operation unit 18 is composed of push-buttons, and is a functional unit to directly operate the MFP 1.

Incidentally, in order for a user directly to use the MFP 1 based on display on the display unit 17 and operation in the operation unit 18, the user is required to log into the MFP 1 in accordance with the respective user information in advance. The user information is information to determine who uses the MFP 1, which is concretely a user ID. Since the MFP 1 may be used by respective users logging into the same using respective user IDs as described above, it is possible to accumulate the electric energy for each user. In addition, the user IDs may be commonly used for the PC 2 described later.

In order to execute processing by the printer unit 15 or the reading unit 19, a warming-up process, which is a process to prepare the printer unit 15 or the reading unit 19, is required, respectively. Incidentally, in the present exemplary embodiment, the warming-up process of the printer unit 15 is called a printing W/U process, and the warming-up process of the reading unit 19 is called a reading W/U process.

Further, the printer unit 15 and the reading unit 19 are in one of either a processing state, a sleeping state or a ready state where the power source (not illustrated) is turned on. The processing state is a state where the MFP 1 is executing a process by the printer unit 15 or the reading unit 19.

The sleeping state or the ready state of the printer unit 15 is a standby state for the MFP 1 to accept a printing instruction from the PC 2, etc. The sleeping state or the ready state of the reading unit 19 is a standby state for the MFP 1 to read a document. In addition, in these two states, it differs whether the respective warming-up process of the printer unit 15 or the reading unit 19 has been finished.

That is, since, in the sleeping state, the warming-up process of the printer unit 15 or the reading unit 19 is not finished, the printer unit 15 or the reading unit 19 cannot immediately execute the process. However, since, in a ready state, the warming-up process of the printer unit 15 or the reading unit 19 is finished, the printer unit 15 or the reading unit 19 can immediately execute the process.

The printer unit 15 and the reading unit 19 of the MFP 1 according to the present exemplary embodiment, respectively, execute the respective warming-up processes when accepting a printing instruction, a reading instruction and a copying process in a sleeping state, and after the warming-up processes are finished, the state is shifted to the processing state. After that, the printer unit 15 and the reading unit 19 are shifted to a ready state in a fixed period of time (the sleeping-shift time) after the processing state is cancelled, and are shifted to a sleeping state after the fixed period of time (the sleeping-shift time) elapses.

According thereto, it is possible to prevent useless warming-up processes from being brought about when continuously accepting printing instructions and when continuously accepting reading instructions of documents and copying instructions thereof. Further, since the ready state is prevented from being maintained for a long period of time, consumption power can be saved.

The PC 2 includes a control circuit 20, which consists of a CPU 21, a ROM 22, and a RAM 23, a hard disk (hereinafter called "HDD") 24, an operation unit 25, a display unit 26 and a network I/F 27.

The ROM 22 mainly stores basic programs (BIOS, etc.) for the PC 2. The HDD 24 stores an operating system (OS) composed on the basic programs.

In addition, the operation unit 25 is composed of a mouse, a keyboard, etc. By a user operating the operation unit 25, various types of data are input, and various types of programs including a driver program are carried out. The display unit 26 is composed of a CRT, an LCD, etc., which displays various data and information to a user. In addition, the network I/F 27 connects the PC 2 and the network 3 to each other so as to send/receive data to/from the MFP 1.

The HDD stores a printer driver for transmitting a printing job from the PC 2 to the MFP 1. A user is able to transmit a printing job to the MFP 1 by using the printer driver.

Incidentally, the PC 2 is logged-in in accordance with the respective user IDs described above in a state where the power source (not illustrated) is turned on. By transmitting a printing job with the user ID attached thereto when transmitting the printing job to the MFP 1, it is possible to determine who transmits the printing job.

(Printing Power Accumulation Process)

Figure 2:
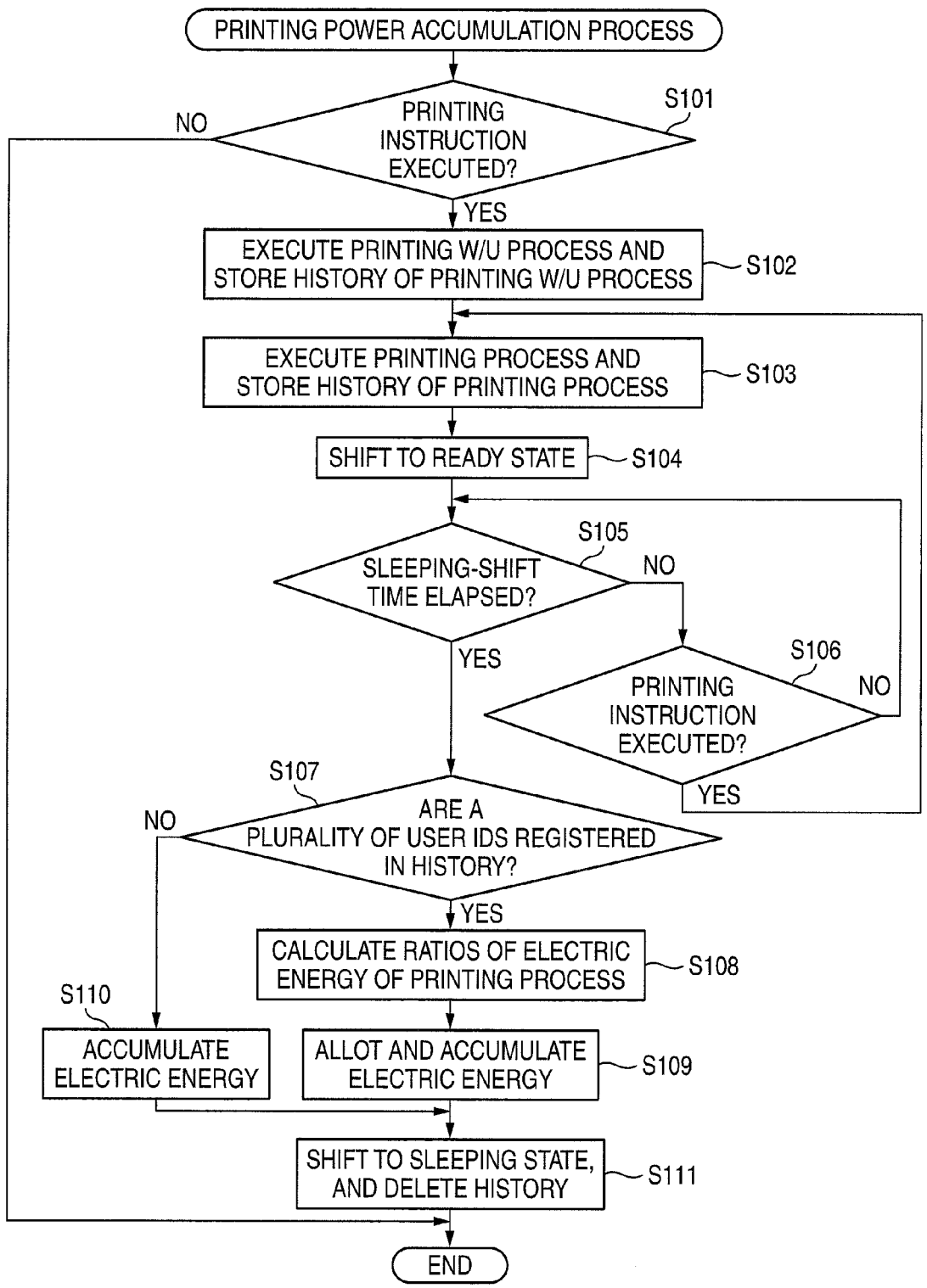
FIG. 2 is a flowchart showing a printing power accumulation process of the MFP.
Figure 3:
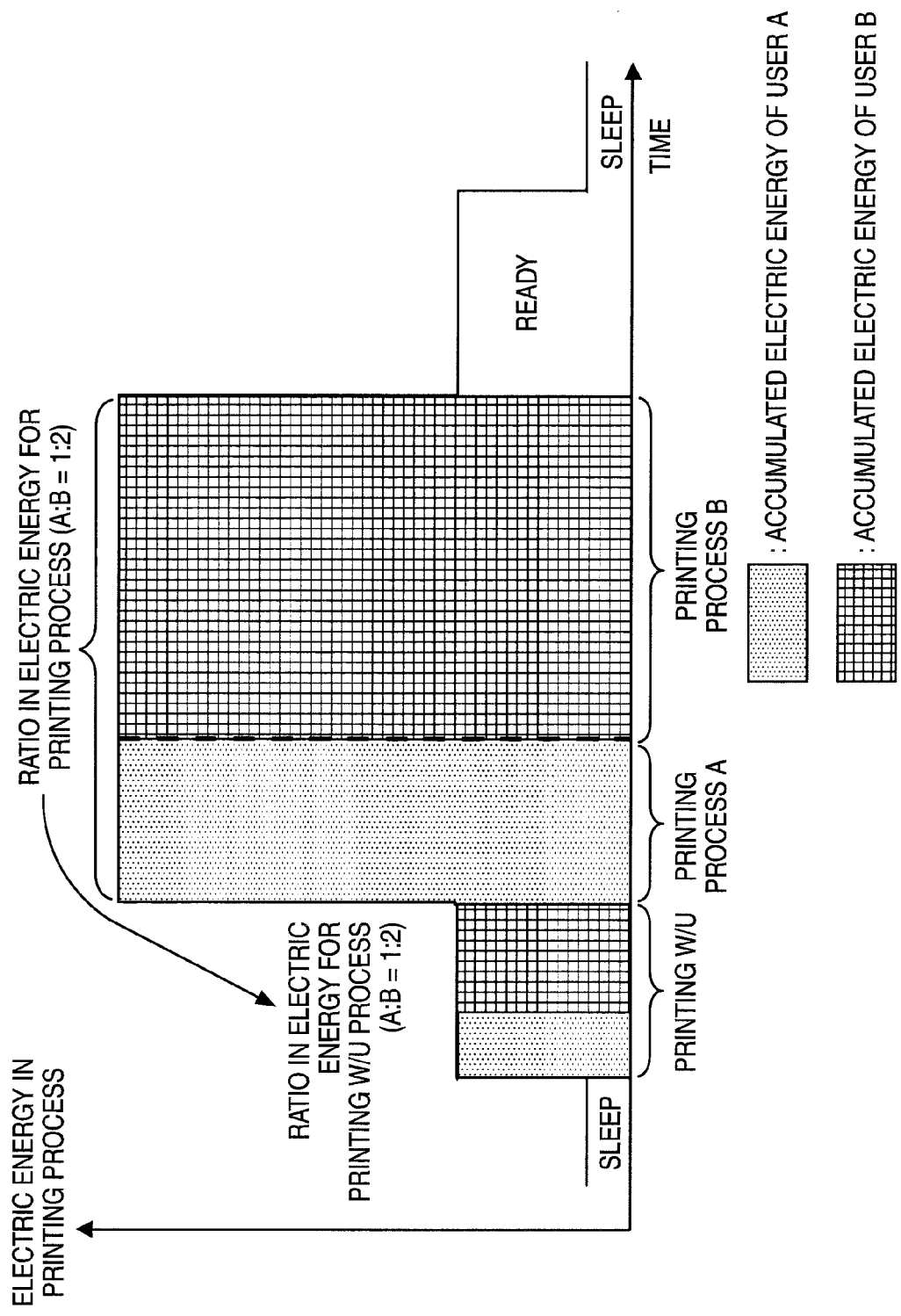
FIG. 3 is an explanatory drawing showing an example of a process of accumulation in the printing power accumulation process.

Referring to FIGS. 2 and 3, a printing power Accumulation process will be described.

The printing power accumulation process shown in FIG. 2 is a process that is periodically carried out in short intervals in a state where the power source of the MFP 1 is turned on and the printer unit 15 is in a sleeping state. As the process is commenced, the following processes are executed by the control circuit 10.

First, it is determined in S101 whether a printing instruction is executed. The determination is made based on whether or not a printing job has been received from the PC 2 or whether or not a printing instruction described later has been executed.

Here, if no printing instruction has been executed (S101: N), the printing power accumulation process is finished. In contrast, if a printing instruction has been executed, (S101: Y), a printing W/U process is executed in S102, and the printer unit 15 is prepared to a usable state. In S102, the history of the printing W/U process is further stored in the HDD 14. The ID of a user who has executed a printing instruction and the electric energy consumed by the printing W/U process are recorded in the history.

After that, a printing process is executed in S103, and an image is printed on a sheet. Further, in S103 the history of the printing process is stored in the HDD 14. As in the history, the ID of a user who has executed a printing instruction and the electric energy consumed by the printing process are recorded as in the history described above.

After S103 is finished, the printer unit 15 is shifted to a ready state in S104. And, it is determined in S105 whether the sleeping-shift time has elapsed. The sleeping-shift time shows the time of shifting from the ready state to the sleeping state. As the time has elapsed (S105: Y), the state is shifted to the sleeping state in S111 described later. Herein, measurement of the sleeping-shift time as described above is reset whenever the printing process is executed.

If it is determined in S105 that the sleeping-shift time has not elapsed, it is determined in S106 as in S101 whether a printing instruction has been executed. And, if it is determined in S106 that no printing instruction has been executed (S106: N), the process returns to S105.

As described above, since the processes of S105 and S106 are repeatedly executed, it is configured that the printer unit 15 waits for a printing instruction while being in a ready state until the sleeping-shift time elapses. In contrast, if it is determined in S106 that the printing instruction has been executed (it is determined that the printing instruction has been executed in a ready state) (S106: Y), the process returns to S103, and the subsequent processes are as described above.

In contrast, if it is determined in S105 that the sleeping-shift time has elapsed (S105: Y), it is determined in S107 whether or not a plurality of user IDs are registered in the history in the HDD 14. Here, if a plurality of user IDs are registered in the history (S107: Y), the process goes to S108. In S108, the electric energy consumed by the printing process, which corresponds to all the user IDs in the history, is read, and the ratios are calculated for each user ID.

After that, in S109, the electric energy consumed in the printing W/U process in the history is allotted to respective user IDs and accumulated in accordance with the ratios calculated in S108. According thereto, it is possible to allot the electric energy consumed in the printing W/U process to each of the users in accordance with the electric energy consumed in the printing process. Incidentally, the electric energy consumed in the printing process by the respective users is accumulated for each user ID.

In contrast, if a plurality of user IDs are not registered in the history in S107, that is, if only one user ID is registered in the history (S107: N), the electric energy consumed in the printing W/U process and the printing process is accumulated to the user ID (S110).

When the processes in S109 and S110 are finished, the printer unit 15 is shifted from the ready state to the sleeping state in S111, the history in the HDD 14 is deleted, and thus the printing power accumulation process is finished.

According thereto, the electric energy consumed by the printing process is accumulated for each user. By accumulating the electric energy as in the present exemplary embodiment, it is possible to allot the electric energy consumed in the printing W/U process to a user who has executed a printing instruction and to accumulate the electric energy. Further, the electric energy consumed by the printing W/U process can be allotted in accordance with the load of the printing process.

Next, referring FIG. 3, a detailed example of the printing power accumulation process will be described. In FIG. 3, a width in area thereof expresses an amount of the electric energy.

FIG. 3 shows an example where a printing instruction from a user A is executed where the printer unit 15 is in the sleeping state, and thereafter another printing instruction from a user B is executed.

In this case, the printing W/U process is executed so that the printer unit 15 becomes usable (S102 in FIG. 2) before the printing process based on a printing instruction from the user A (printing process A) is executed, and the printing process A is executed (S103 in FIG. 2). Since the MFP 1 accepts a printing instruction from the user B (S106 in FIG. 2: Y), the printing process based on the printing instruction from the user B (printing process B) is executed.

After that, when the sleeping-shift time elapses, and the ready state is shifted to the sleeping state (S105 in FIG. 2: Y), the ratios of the electric energy used in the printing processes A and B are calculated (S108 in FIG. 2). Further, in the case of this example, the ratio of the electric energy in the printing process A to the electric energy in the printing process B is 1 to 2.

Next, the electric energy consumed in the printing W/U process is allotted and accumulated, using the electric energy ratio of 1 to 2. Therefore, the electric energy consumed in the printing W/U process is accumulated for the users A and B at a ratio of 1 to 2 (S109 in FIG. 2).

(Reading Power Accumulation Process)

Figure 4:
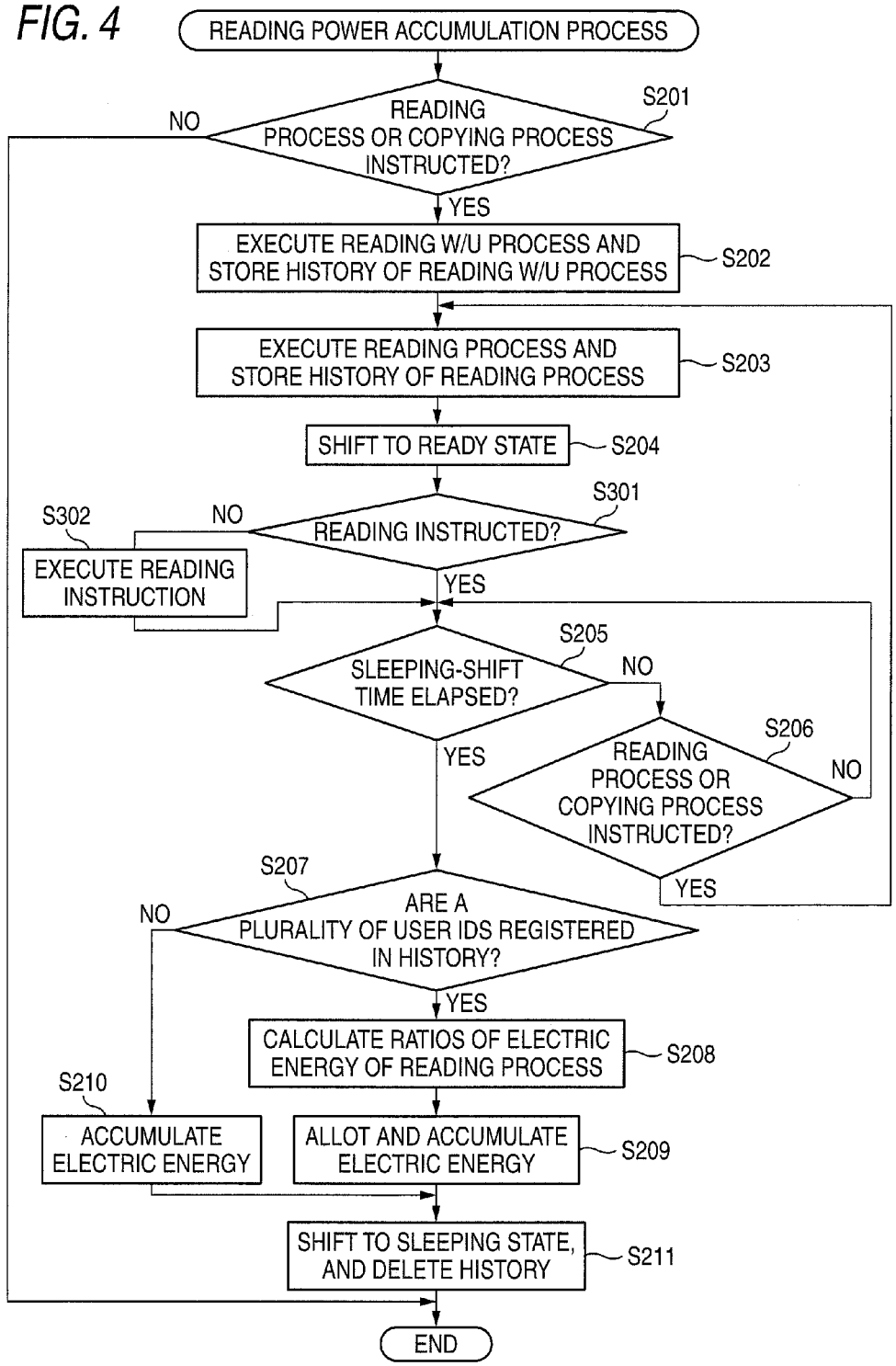
FIG. 4 is a flowchart showing a reading accumulation process by the MFP.
Figure 5:
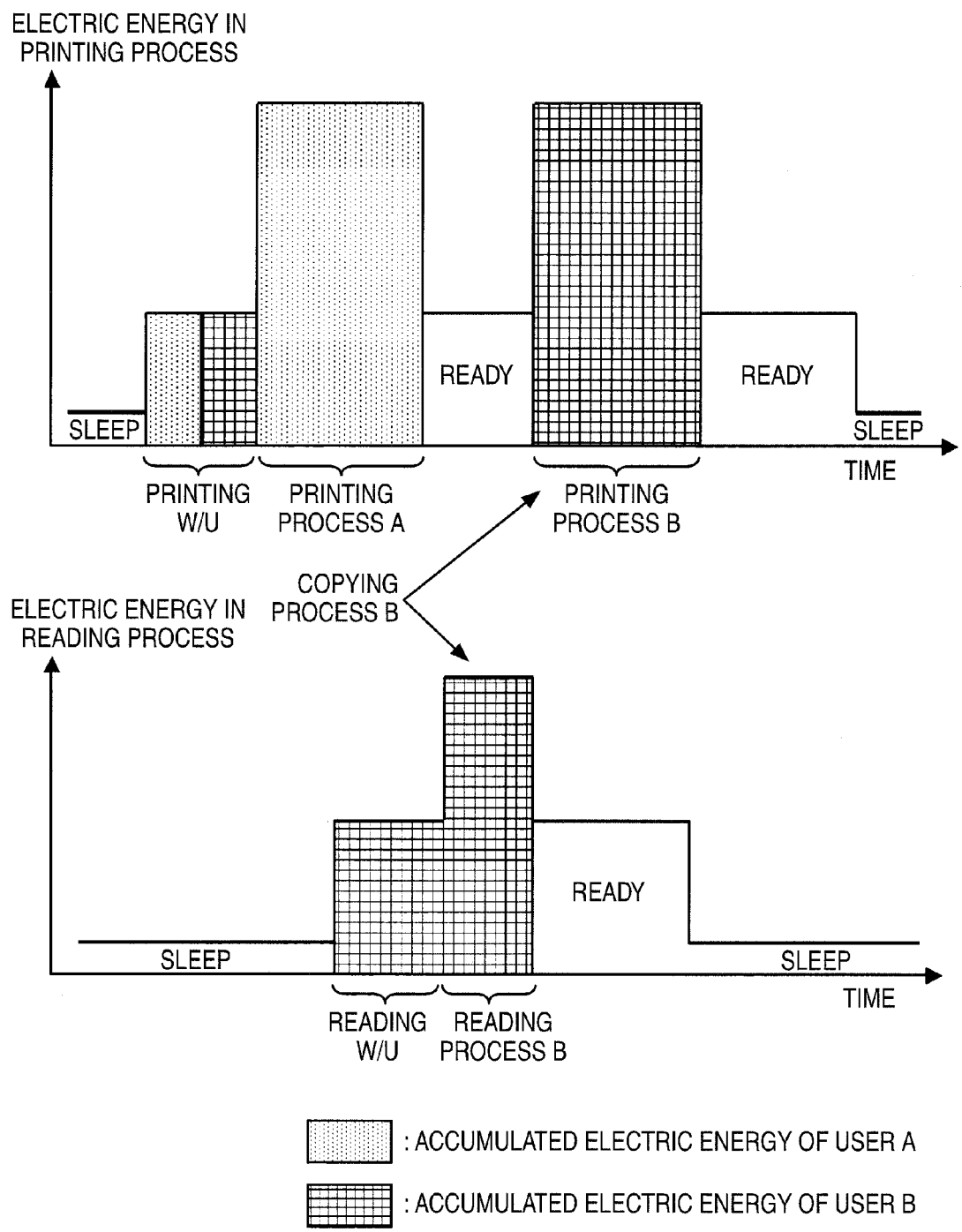
FIG. 5 is an explanatory drawing showing an example of a process of accumulation where the printing power accumulation process and the reading power accumulation process are continuously executed.

Referring to FIGS. 4 and 5, a reading power accumulation process will be described.

The reading power accumulation process shown in FIG. 4 is a process that, in a state where the power source of the MFP 1 is turned on, is periodically carried out in short intervals when the reading unit 19 is in a sleeping state. As the process is commenced, the control circuit 10 executes the following processes. Incidentally, the reading power accumulation process is somewhat similar to the printing power accumulation process described above, and thus description of similar portions is omitted.

First, it is determined in S201 whether or not either one of the reading process or the copying process has been instructed by a user. In detail, it is determined whether a document has been placed on the reading unit 19, and an instruction to commence any one of the reading process and the copying process has been executed through operations of the operation unit 18 by the user. Further, in order to directly operate the MFP 1 by the operation unit 18 as described above, it is necessary to log-in in advance using a user ID.

Here, if it is determined that the reading process or the copying process has not been instructed (S201: N), the reading power accumulation process is finished. In contrast, if it is determined that the reading process or the copying process has been instructed (S201: Y), in processes from S202 through S204, the reading W/U process, which is a process to prepare the reading unit 19 for a usable state, is executed, the history of the reading W/U process is stored in the HDD 14, a reading process to generate image data by reading a document is executed, the history of the reading process is stored in the HDD 14, and shifting to the ready state of the reading unit 19 is executed.

Incidentally, since the processes from S202 through S204 are processes from S102 through S104 in the printing power accumulation process described above, which are executed in the reading process, description thereof is omitted. Incidentally, the user ID recorded in the history is the ID of a user who has executed an instruction of the reading process or the copying process.

When the process of S204 is finished, it is determined in S301 whether or not the reading process has been instructed in S201. In the present exemplary embodiment, since any one of the reading process and the copying process is instructed in S201, it is determined in S301 which one of the reading process or the copying process has been instructed. Here, if it is determined that the reading process has not been instructed but the copying process has been instructed (S301: N), a printing instruction is executed in S302, and the printing power accumulation process shown in FIG. 2 is executed. That is, by executing the printing instruction by S302, the printing process of image data generated by the reading process in S203 is executed by the printer unit 15.

Since the processing has been carried out as in S301 and S302, the reading process and the printing process for the copying process are independently processed, and thus it is possible to accumulate the electric energy used in the respective processes, respectively. Incidentally, the printing power accumulation process and the reading power accumulation process, respectively, are independently processed by the control circuit 10.

In contrast, if it is determined in S301 that a reading process has been instructed (S301: Y), the processes after S205 are executed after a process in S302. The processes from S205 through S211 are processes in which the processes from S105 through S111 in the printing power accumulation process are executed in the reading process. Therefore, description thereof is omitted.

Further, the process of s206 determines, as in s201, whether a document has been placed on the reading unit 19, and either one of the reading process or the copying process has been instructed for commencement through operations of the operation unit 18 by a user.

Accordingly, the electric energy consumed by the reading process is accumulated for each user. By accumulating the electric energy as in the present exemplary embodiment, it is possible to allot the electric energy consumed in the reading W/U process to users who have instructed a reading process or a copying process, and to accumulate the electric energy. Furthermore, the electric energy consumed by the reading W/U process can be allotted in accordance with the load of the reading process.

Further, the electric energy consumed in the reading process and the printing process in the copying process, respectively, can be independently accumulated.

Next, referring to FIG. 5, an example of detailed process of accumulation where the printing power accumulation process and the reading power accumulation process are continuously executed. In FIG. 5, a width in area thereof expresses an amount of the electric energy.

FIG. 5 shows an example in which a copying process is instructed by a user B where the reading unit 19 is in the sleeping state while the printing power accumulation process is executed with the MFP 1 having accepted a printing instruction from a user A where the printer unit 15 is in the sleeping state.

In this case, before the printing process A, the printing W/U process is executed (S102 in FIG. 2) so that the printer unit 15 is made usable, and then the printing process A is executed (S103 in FIG. 2). If an instruction of a copying process from the user B is executed (S201 in FIG. 4: Y) while the printing process A is being executed, the reading W/U process is executed (S202 in FIG. 4) so that the reading unit 19 is made usable, and the reading process (reading process B) instructed by the user B is executed (S203 in FIG. 4).

When the printing process A is finished, the printer unit 15 is shifted to the ready state (S104 in FIG. 2), a printing instruction is executed, or a standby state is maintained until the sleeping-shift time elapses. In the example shown in FIG. 5, since the process instructed by the user B is a copying process, a printing instruction is executed so that the printing process B is continuously executed by the printer unit 15 when the reading process B is finished by the reading unit 19 (S302 in FIG. 4). Accordingly, the ready state of the printer unit 15 is cancelled by executing the printing instruction from the user B, and the printing power accumulation process is executed by the printer unit 15.

After that, the electric energy consumed by the printing process is accumulated for each user. Then, in accordance with FIG. 3, ratios of the electric energy used in the printing processes A and B are calculated (S108 in FIG. 2), and the electric energy consumed in the printing W/U process is accumulated for the users A and B in accordance with the calculated ratio (S109 in FIG. 2). On the other hand, as for the accumulated electric energy consumed by the reading process, a new reading process is not executed after the reading process B by the user B is finished as shown in FIG. 5.

Therefore, the electric energy consumed by the reading W/U process is accumulated to the user B (S210 in FIG. 4).

As described above, the printing power accumulation process and the reading power accumulation process independently accumulate the electric energy. In addition, since the copying process is a process in which a printing process and a reading process are continuously executed, the accumulation process of the electric energy is independently executed, respectively.

(Display of Consumption Electric Energy)

A user operates the operation unit 18 of the MFP 1 so as to display the information of the accumulated electric energy on the display unit 17, as shown in FIG. 6.

The information shown in FIG. 6 shows the accumulated electric energy corresponding to the respective user IDs, the accumulated electric energy in the sleeping state, and the other accumulated electric energy. Incidentally, the other accumulated electric energy is electric energy obtained by accumulating the electric energy not pertaining to the users such as the electric energy in the sleeping state, and the electric energy in the ready state.

By checking the information, the user is able to check how much electric energy the user or the other users consume.

<Modification to Exemplary Embodiments>

While the invention has been shown and described with reference to certain exemplary embodiments thereof, it will be understood by those skilled in the art that various changes in form and details may be made therein without departing from the scope of the invention as defined by the appended claims.

In the above-described exemplary embodiments, management of the electric energy is carried out for each user. Alternatively, the electric energy may be managed for, for example, each of the groups consisting of a plurality of users.

In the above-described exemplary embodiments, the ratios of the electric energy consumed by the respective processes are calculated in S108 in FIG. 2 and S208 in FIG. 4. Alternatively, the electric energy consumed in the warming-up process may be simply allotted to the number of users and be accumulated.

In the above-described exemplary embodiments, the consumed electric energy is measured and is accumulated for each user. Alternatively, the process of the accumulation may be executed by, for example, estimating and using the electric energy consumed in the MFP 1 based on the data quantity, etc.

In the above-described exemplary embodiments, MFP 1 executes processes of displaying consumption electric energy (see FIG. 6), accumulating the electric energy and allotting the electric energy. Alternatively, the processes can be executed by the PC 2.

In the above-described exemplary embodiments, a accumulation process is described based on three processes: a printing process; a reading process; and a copying process. However, the image processing is not limited to these three processes. For example, the accumulation process according to the above-described exemplary embodiments may be applicable to other image processes such as a facsimile communication process, etc.

In the above-described exemplary embodiments, an MFP is described as one example of an image processing apparatus. However, the image processing apparatus is not limited to the MFP. For example, the image processing apparatus may be an apparatus capable of carrying out image processing and executing preparation processes such as a warming-up process, which is, for example, a copying machine, a multi-function apparatus, a printer, a scanner or a facsimile apparatus.

What is claimed is:

1. An image processing apparatus configured to shift between a sleeping state and a processing state, the image processing apparatus comprising:
    an image processing unit configured to execute an image process in accordance with an instruction by a user when the image processing apparatus is in the processing state;
    an accumulating unit configured to accumulate electric energy consumed in a preparation process of the image processing unit for each user, wherein the preparation process is carried out when the image processing apparatus is in the sleeping state, and wherein the image processing apparatus is configured to shift to the processing state upon the preparation process being completed; and
    a control unit which, in a case where the image processing unit is made usable by a specific preparation process and executes image processes in accordance with a plurality of instructions by a plurality of users in the processing state and then shifts to the sleeping state from the processing state, is configured to control the accumulating unit to allot and accumulate to each user only the electric energy consumed in the specific preparation process for each respective user of the plurality of users that has instructed to execute image processes executed after the specific preparation process.

2. The image processing apparatus according to claim 1, wherein the accumulating unit is configured to accumulate the electric energy consumed in the preparation process of the image processing unit for each group of users, and
    wherein, in the case where the image processing unit is made usable by the specific preparation process and executes image processes in accordance with a plurality of instructions by the plurality groups of users in the processing state and then shifts to the sleeping state from the processing state, the control unit is configured to control the accumulating unit to allot and accumulate the electric energy consumed by the specific preparation process for each of the plurality of groups of users.

3. The image processing apparatus according to claim 1, wherein the image processing unit comprises a plurality of functional units corresponding to a plurality of types of the image processes, and
    wherein the accumulating unit is configured to accumulate the electric energy consumed in the preparation processes in accordance with the plurality of functional units, respectively.

4. The image processing apparatus according to claim 1, wherein the control unit is configured to control the accumulating unit to allot and accumulate the electric energy consumed by the specific preparation process for each of the plurality of users in accordance with ratios, each of which is identical with a respective ratio of the electric energy consumed in the image process that has been executed in accordance with each of the plurality of instructions by each of the plurality of users.

5. The image processing apparatus according to claim 1, further comprising:
    a display unit configured to display the electric energy accumulated by the accumulating unit for each user.

6. The image processing apparatus according to claim 1, wherein the accumulating unit is further configured to accumulate electric energy consumed in the image process executed by the image processing unit, and wherein the control unit is further configured to control the accumulating unit to accumulate a third electric energy including:
  a first electric energy consumed in the specific preparation process allotted to one of the plurality of the users; and
  a second electric energy consumed in the image process executed in accordance with one of the plurality of instructions by the one of the plurality of the users.

7. An image processing system configured to shift between a sleeping state and a processing state, the image processing system comprising:
  an image processing unit configured to execute an image process in accordance with an instruction by a user when the image processing system is in the processing state;
  an accumulating unit configured to accumulate electric energy consumed in a preparation process of the image processing unit for each user, wherein the preparation process is carried out when the image processing apparatus is in the sleeping state, and wherein the image processing system is configured to shift to the processing state upon the preparation process being completed; and
  a control unit which, in a case where the image processing unit is made usable by a specific preparation process and executes image processes in accordance with a plurality of instructions by a plurality of users in the processing state and then shifts to the sleeping state from the processing state, is configured to control the accumulating unit to allot and accumulate to each user only the electric energy consumed in the specific preparation process for each respective user of the plurality of users that has instructed to execute image processes executed after the specific preparation process.

8. The image processing system according to claim 7,
  wherein the accumulating unit is configured to accumulate the electric energy consumed in the preparation process of the image processing unit for each group of users, and
  wherein, in the case where the image processing unit is made usable by the specific preparation process and executes image processes in accordance with a plurality of instructions by the plurality groups of users in the processing state and then shifts to the sleeping state from the processing state, the control unit is configured to control the accumulating unit to allot and accumulate the electric energy consumed by the specific preparation process for each of the plurality of groups of users.

9. The image processing system according to claim 7, further comprising:
  a multi-function printer; and
  an image processing apparatus that is connected to the multi-function printer via a network,
  wherein the multi-function printer comprises the image processing unit, and
  wherein at least one of the multi-function printer and the image processing apparatus comprises the accumulating unit and the control unit.

10. The image processing system according to claim 7,
  wherein the accumulating unit is further configured to accumulate electric energy consumed in the image process executed by the image processing unit, and
  wherein the control unit is further configured to control the accumulating unit to accumulate a third electric energy including:
    a first electric energy consumed in the specific preparation process allotted to one of the plurality of the users; and
    a second electric energy consumed in the image process executed in accordance with one of the plurality of instructions by the one of the plurality of the users.

* * * * *